T. HEERMANS.
Preserving Process.
No. 43,406.  Patented July 5, 1864.
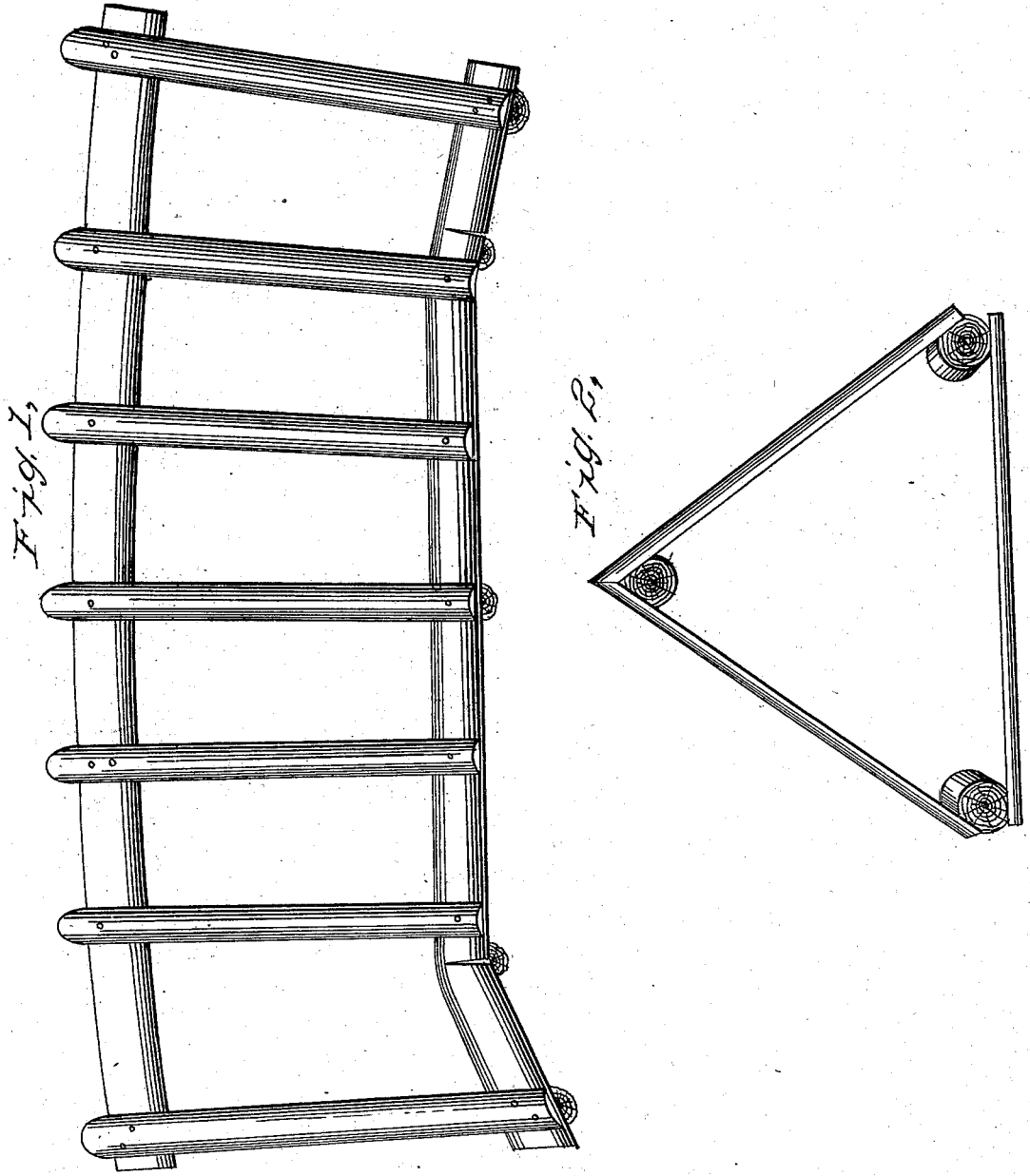

UNITED STATES PATENT OFFICE.

THEODORE HEERMANS, OF MITCHELLVILLE, TENNESSEE.

CURING AND DRYING HAY, GRAIN, &c.

Specification forming part of Letters Patent No. 43,105, dated July 5, 1864.

*To all whom it may concern:*

Be it known that I, THEODORE HEERMANS, of Mitchellville, in the county of Sumner and State of Tennessee, have invented a certain new and useful Improvement in Curing and Drying Hay, Grain, &c.; and I do hereby declare that the following is a full, clear, and exact description of the same, reference being had to the accompanying drawings, and to letters and marks thereon, said drawings being a part of this specification and representing by—

Figure 1 a side view of a rack or frame, and by Fig. 2 an end view thereof, said rack or frame being one of the means that may be used in carrying out my invention.

My present improvement is intended to effect in the "stack" or "rick" the accomplishment of the same object as is brought about by my improved granary, patented 13th October, 1863.

Wheat or other small grain, if stacked immediately after it is cut, will heat and mold. In order to avoid this danger it is put into "shocks," so that it may dry. In this condition large quantities are damaged by the shocks falling down and the wheat sprouting.

My improvement obviates all these difficulties by ventilating the stacks so effectually that it is impossible for the wheat to heat in the stack.

It will be readily seen that grain can be more effectually ventilated in narrow ricks than round stacks, as the ventilators can be more conveniently arranged.

Ventilation is effected by placing the ventilators horizontally lengthwise through the ricks in such relation to each other as will effectually prevent the wheat or other grain from heating. This is done by laying down a layer of grain or hay; then if the rick is narrow, lay down one row of ventilators; if wide, use two or more, as may be necessary; then pack another layer of hay or grain around and over these, say some two feet deep; then use other ventilators in the same way, and so on until the rick is as high as desired.

Ricks of any length may be ventilated by using several ventilators, by bringing the ends together and tying them so that they will not move. It is best to make the ventilators some eight or nine feet long, so that if the wheat is thrashed out before it is sufficiently dry to keep, it may be put up in pens and be as effectually dried in the chaff as in the stack by using the ventilators in the pens. This may be done by placing the ends opposite the cracks or openings in the pen and placing a layer of straw next to the ventilator, to keep the wheat from entering them. It will be readily seen that this plan of ventilation will not only save vast quantities of grain from damage, but will save an immense amount of labor in binding and shocking grain. This system applies equally well for ventilating hay in the stack or rick, and by placing the ends of the racks opposite to openings in the barn hay may be cured in the barn, thus adding much to the quality of the hay, as hay cured in the house is much better than that cured out of doors.

I use the $\wedge$-shaped rack or frame, as shown by the drawings, as a ventilator, because it is easiest made; but it is obvious that other forms may be used; for instance, two planks may be used with holes bored in the sides with strips nailed on the top and bottom, or poles or laths may be used lengthwise, and a frame of any shape, and by placing the strips close together these ventilators may be used for ventilating corn in cribs or pens. The outside ends of the ventilators should be depressed, as shown by Fig. 1 of the drawings, or bent downward, so as to prevent water from running into the stack and to give a proper inclination to the straw. If poles are used, they may be sawed into some two or three feet from the end and the bottom pieces bent downward and outward, as represented by the drawings. The top piece should not be bent as much as the bottom pieces. By this means the end of the ventilator, where the air enters, is flared, thus allowing a much larger quantity of air to enter the ventilators. If planks are used, the top edge near the ends may be sloped, sawed on the side, bent outward, and a piece in the shape of a wedge nailed on the bottom edge, thus flaring the end. Ventilators used in the interior of ricks, as those in pens or cribs, may be straight. Vertical ventilators may be used in connection with horizontal ones; or, where it is most convenient, horizontal ventilators alone may be used. For instance, for curing hay in the barn the ventilators may be placed over holes in the floor and pass out through the hay near the roof.

In many sections of the country machines for cutting off the heads of the wheat are used. When this is done, the wheat is stacked immediately, and, being in a loose condition, has to be put in large ricks to make them stand, and unless the wheat is very ripe and dry it will heat and mold. Such heavy losses have been sustained in this way that farmers have been deterred from using this otherwise valuable way of cutting wheat by machines, as its use certainly saves a vast amount of labor. The use of these ventilators will obviate this danger. Another good way to ventilate stacks of any kind is to take three or more poles, place the lower ends four feet apart at the bottom, or more or less, as may be necessary, bringing the top ends together at a sufficient distance from the ground to allow the air to circulate freely, let in cross-pieces, and pin or otherwise fasten them to the poles, so that they can be taken to pieces again. The ends of boards or sticks that form the floor may rest on these cross-pieces, while the other ends may rest on rude trestles made for the purpose, or on pieces of timber placed on blocks of timber or rock, as may be most convenient. By this means the poles will be firmly held to the ground, and the danger of the stacks being blown down obviated. If necessary to sustain the weight of the stack, props may be placed under these cross-pieces. At intervals other cross-pieces may be fastened to the poles, thus strengthening them. In this way very light poles may be used. By this plan of stacking the circumference of the stack will be such that a large quantity of hay or grain may be put in a stack. By this means all the heads are exposed to the air, and all danger of heating or molding obviated.

For stacking hay or grain in ricks, set up poles, plank, or scantling some four feet apart at the foot, and let them come together at the top, like the rafters of a house. At a distance of six or eight feet set up two more in like manner, and so on until the rick is long enough. Near the foot of these poles or rafters let in pieces of timber. Upon these pieces will rest the ends of the boards or sticks that form the floor of the rick. If necessary, props may be placed under these pieces, as nearly the whole weight of the stack will rest upon them. At proper distances above the floor strips or poles may be fastened, so as to prevent the grain from pressing in and to keep the poles or rafters to their places. These pieces will have a tendency to hold up the heads of the grain, thus allowing only the outside of the stack to settle. By this means the outer ends of the straw is depressed, causing the stack to turn water much better than the ordinary way of stacking. Upon the old plan of stacking, the grain being inside and being heavier than the outside, the head settles more than the outside, causing the water to run in, which is a great cause of so much grain being damaged in the stack. At proper distances pieces should be fastened to the poles or rafters in the shape of girders. This will prevent the poles or rafters from binding. Rafters supported in this way may be made of very light material. The poles being nearly vertical, the weight of the stack will nearly all be upon the floor, thus holding the foot of the poles or rafters firmly to the ground and obviating the necessity of burying them. The timbers should be pinned together so that they can be taken apart and put under shelter, thus keeping them for many years. By this means the stack-yard may be changed annually, which is a great advantage, as the grain can be stacked in the field where it grows. The ends of ricks that are intended to stand during the winter may be closed after the grain is dry, thus furnishing a warm place for keeping pumpkins, potatoes, turnips, apples, &c.

What I claim as my invention, and desire to secure by Letters Patent, is—

Curing and drying hay, grain, &c., in ricks, stacks, mows, or pens in the manner and by the means substantially as herein set forth.

This specification signed this 11th day of June, 1864.

THEODORE HEERMANS.

Witnesses:
THOS. T. EVERETT,
T. SMITH.